Figure 1:
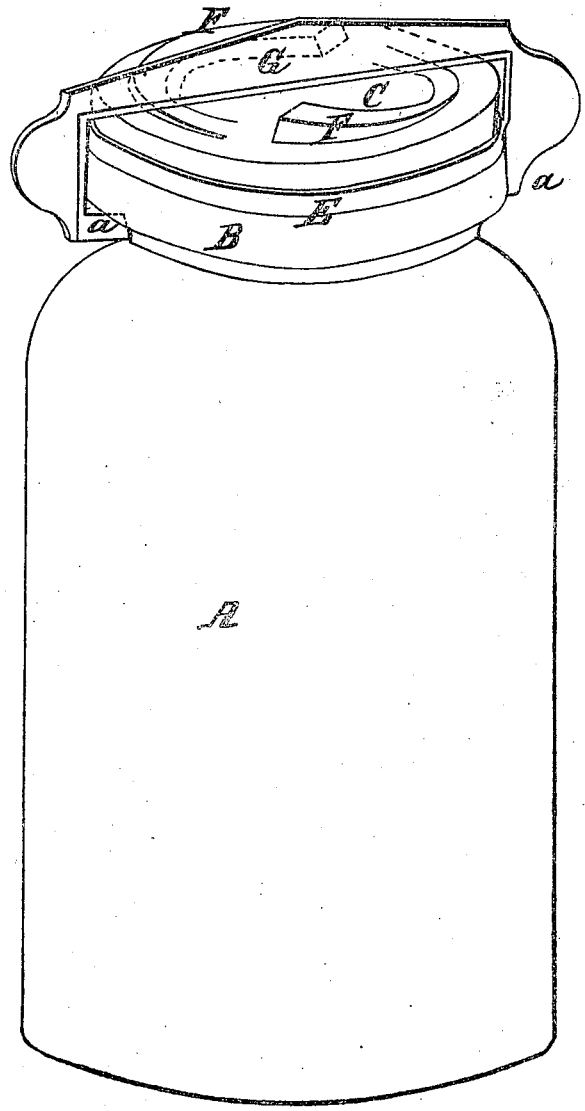

A. J. H. HILTON.
FRUIT JAR AND CLAMP.

No. 76,915. Patented Apr. 21, 1868.

Witnesses.
Eben Hutchinson
E. T. Hall

Inventor
A. J. H. Hilton

United States Patent Office.

ALEXANDER J. H. HILTON, OF BOSTON, MASSACHUSETTS.

Letters Patent No. 76,915, dated April 21, 1868; antedated March 10, 1868.

IMPROVED FRUIT-JAR AND CLAMP.

The Schedule referred to in these Letters Patent and making part of the same.

Be it known that I, ALEXANDER J. H. HILTON, of Boston, in the county of Suffolk, and State of Massachusetts, have invented a new and useful Jar for Preserving Fruit; and I do hereby declare that the following is an exact, full, and clear description of the same, reference being had to the accompanying drawings, in which—

Figure 1 is a perspective view.

In the drawings, A denotes a jar, of glass or other suitable material, on the neck of which is formed a shoulder, B. C denotes a cover, having a flange on the under side, placed about one-fourth of an inch from the edge, the use of which is to hold in place the rubber packing-ring E. The inner edge of the packing-ring E rests against the outer edge of the flange, it lying flat against the under side of the cover C. F F denote two cams or circular inclined planes formed on the upper side of the cover C. G denotes a clamp, of iron or other suitable metal, having space enough between its jaws to allow it to slip over the cover C. The lower end of the jaws a of the clamp G project inward under shoulder B of jar A.

In using my jar, the rubber packing-ring E is placed flatwise on the under side of the cover C, the flange keeping it in place. The cover is placed on the jar, the packing-ring coming between it and the rim of the neck of the jar. The clamp G is then placed on, over to the plain part of the cover, then turned. The inward projections on the jaws of the clamp, under the shoulder B, cause the clamp to move around horizontally. The under side of the shank of the clamp, pressing against the cams or inclined planes F F, forces the cover down firmly.

The jar and cover may be made of glass or any other suitable material.

I disclaim the devices as claimed in the patents of J. Adams, dated May 20, 1862, T. Earle, November 10, 1863, and J. Johnson, July 10, 1866; but What I do claim, is—

The angular clamp G, with its jaws a a, in combination with the inclined planes F F of the cover C, the rubber packing-ring, and the straight shoulder B of the jar A, all as specified.

In testimony whereof, I have signed my name to this specification in the presence of two subscribing witnesses

ALEXANDER J. H. HILTON.

Witnesses:
EBEN HUTCHINSON,
E. T. HALL.